United States Patent [19]

Clemenson

[11] Patent Number: 5,623,978

[45] Date of Patent: Apr. 29, 1997

[54] STUMP CUTTING DOUBLE CLAW TOOTH STRUCTURE

[76] Inventor: Lyle Clemenson, 100 N. 74th Way, Brooklyn Park, Minn. 55444

[21] Appl. No.: 688,692

[22] Filed: Jul. 29, 1996

[51] Int. Cl.$^6$ .............................. B27C 1/00; A01G 23/06
[52] U.S. Cl. .................. 144/235; 37/302; 144/24.12; 144/241; 144/334; 407/61; 175/383; 299/102
[58] Field of Search ................................ 37/302; 30/379, 30/379.5; 407/34, 47, 61, 120, 101, 113; 144/24.12, 241, 218, 334, 235; 175/382, 383; 299/89, 90, 91, 93

[56] References Cited

U.S. PATENT DOCUMENTS

| | | | |
|---|---|---|---|
| 4,703,786 | 11/1987 | Doskocil | 144/24.12 |
| 4,709,737 | 12/1987 | Jonsson | 144/241 |
| 5,279,345 | 1/1994 | Lemaux et al. | 144/24.12 |

*Primary Examiner*—W. Donald Bray
*Attorney, Agent, or Firm*—Leo Gregory

[57] ABSTRACT

A double claw stump cutting tooth having two cutting heads having cutting faces angled to slice into a stump with both heads adapted for simultaneously cutting or chipping a stump.

7 Claims, 2 Drawing Sheets

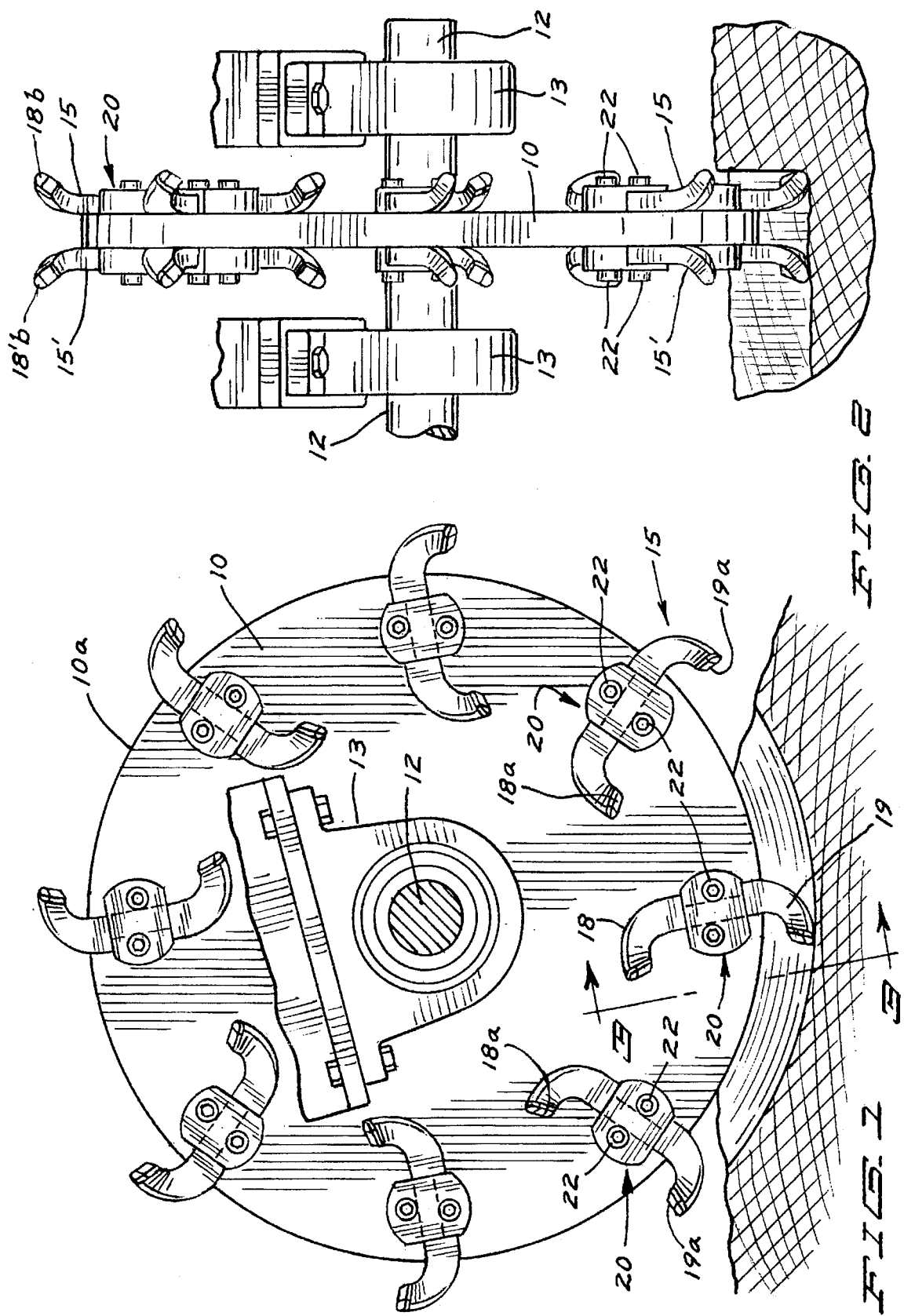

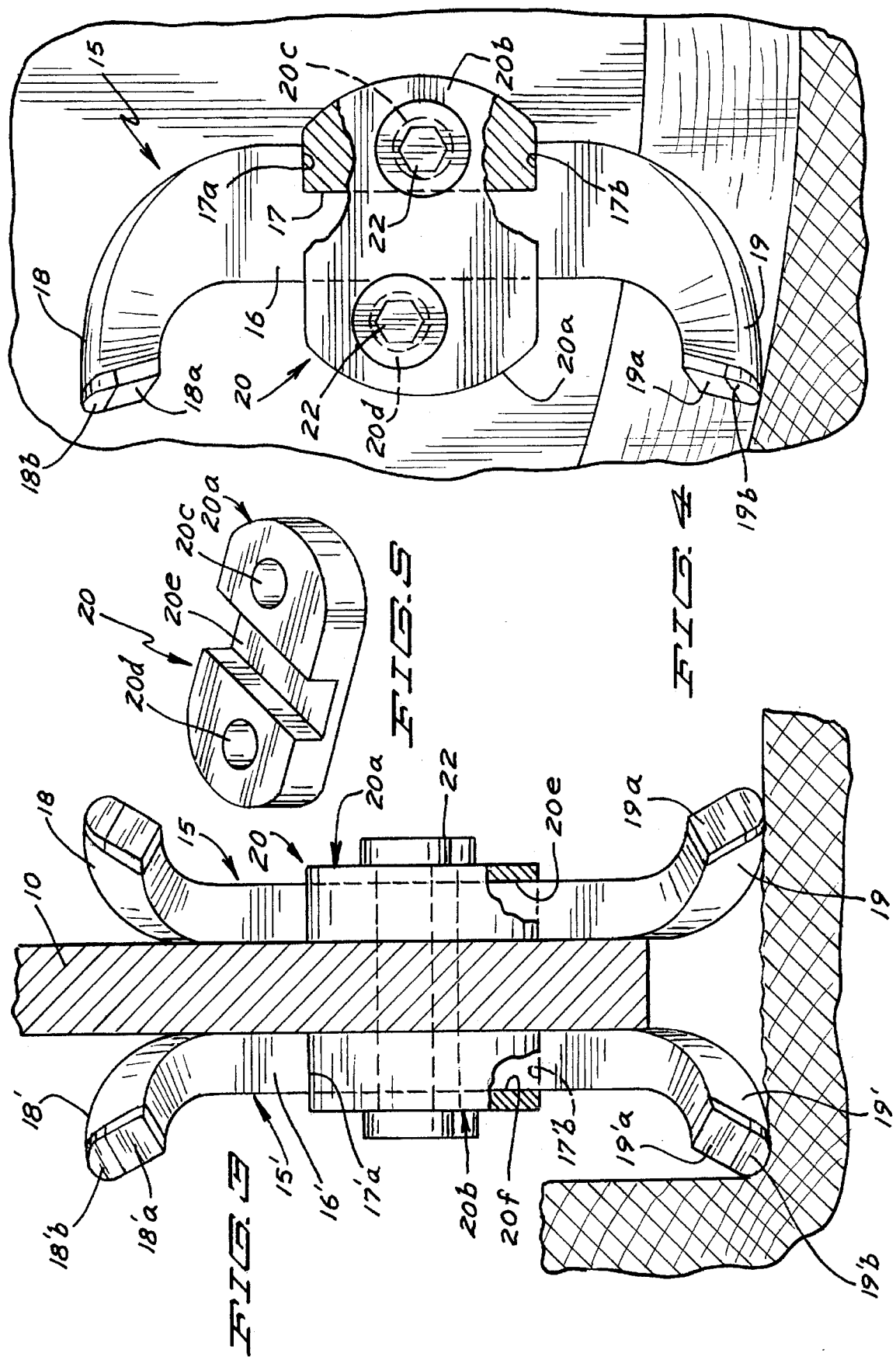

STUMP CUTTING DOUBLE CLAW TOOTH STRUCTURE

BACKGROUND OF THE INVENTION

1. Field of the Invention

This invention relates to stump cutting teeth.

2. Description of the Prior Art

The structure of the invention herein relates particularly to double claw toothed stump cutting teeth as mounted onto a rotary disc of a stump cutting machine.

This invention represents an improvement over the inventor's prior U.S. Pat. No. 4,759,394 in which single tooth cutting elements were disclosed.

Other prior art references are U.S. Pat. No. 2,647,737 showing a flat, horizontally angled tooth having an angled cutting face; in U.S. Pat. No. 5,279,345, there is shown a longitudinally angled cutting tool having a flat planar cutting face and in U.S. Pat. No. 5,381,840 there is shown a cutting tooth with opposite cutting edges each of which cuts depending on the direction of rotation of the cutting wheel.

SUMMARY OF THE INVENTION

It is an object of this invention to provide an improvement over a single tooth structure of a stump cutting tooth.

It is more particularly an object of this invention to provide a double claw type cutting tooth for stump cutting wherein both teeth may be used simultaneously in a tooth cutting operation.

It is another object to provide a stump type cutting tooth adapted to be used with large horsepower cutting machines.

It is a further object herein to provide a stump cutting tooth structure having such an angled cutting edge as to give a longer lasting cutting edge and to have a tendency for self sharpening.

It also is an object to provide a double cutting tooth angled structure to take a relatively bigger cut and require less horsepower in the effort.

These and other objects and advantages of the invention will be set forth in the following description made in connection with the accompanying drawings in which reference characters refer to similar parts throughout the several views.

BRIEF DESCRIPTION OF THE DRAWINGS

FIG. 1 is a side elevational view with a portion broken away showing a rotary disc with teeth mounted therein;

FIG. 2 is a view similar to that of FIG. 1 in front elevation with some parts being broken away;

FIG. 3 is a fragmentary view in side elevation on an enlarged scale showing a detail of structure taken on line 3—3 of FIG. 1 as indicated;

FIG. 4 is a broken view on an enlarged scale similar to that of FIG. 3 in side elevation; and FIG. 5 is a view in perspective.

DESCRIPTION OF A PREFERRED EMBODIMENT

Referring to the drawings and particularly to FIG. 1, a rotary disc blade 10 is shown mounted onto a shaft 12 which is journaled into a bearing block 13, all of which is a part of a conventional stump removal machine of which a further showing will not be made and which is not required for a full disclosure of the invention herein.

As will be described, the double clawed tooth of this invention represents a significant improvement over the tooth structure of the inventors previous patent referred to.

Shown on an enlarged scale in FIG. 4, is a double claw tooth 15 having an elongated shank 16 having a transverse recess or slot 17 in the back portion, centrally thereof, forming shoulders 17a and 17b. Said cutting tooth has heads 18 and 19 which are angled transversely of said shank to diverge laterally and are twisted outwardly to have the respective cutting faces 18a and 19a of each at an obtuse angle to their respective cutting planes. Thus, instead of having a flat impacting engagement with a stump, the cutting faces will have an angled slicing engagement with a stump which requires a great deal less force to reduce a stump than an impacting action. Said cutting faces are provided with carbide tips 18b and 19b to assure long lasting sharp cutting edges. Said carbide tips are conventionally secured.

For reasons which shall be provided, it is well to mount said tooth 15 in opposing pairs on a rotary disc or cutting wheel. Thus, with reference to FIG. 3, the tooth 15 is shown having an oppositely positioned claw tooth 15' of identical structure except for being reversely positioned. Thus, said tooth 15' has a shank 16' having therein a transverse recess or slot 17' forming shoulders 17'a and 17'b and having cutting heads 18' and 19' with their cutting faces 18'a and 19'a respectively having carbide tips 18'b and 19'b.

A significant element of novelty is present in the double clawed tooth of the invention herein in that as positioned on a rotary disc both cutting heads of the tooth face in the same cutting direction and if the cutting action is deep enough into the stump, both cutting heads will be actively engaged in chipping away a stump.

A tooth holder 20 is provided to secure said teeth in an operating position and comprises a pair of mating halves 20a and 20b which are substantially parallelepiped in form and which are mounted in opposed positions on either side of said blade 10 close to the periphery thereof and are secured to said blade by transverse bolts 22 extending through opposed bores corresponding to bores 20c and 20d as shown in FIG. 5 with the holder half 20a it is to be noted particularly that said bores with respect to their alignment are drilled to be 16 to 18 degrees off of horizontal relative to one another. The blade 10 is correspondingly bored though not here shown.

Each of said mating halves 20 a and 20b of said tooth holder respectively have transverse slots 20e and 20f therein to receive the corresponding slotted portions 17 and 17' of said claw teeth to secure said claw teeth in operating position on said blade 10.

In operation, the teeth, in having their cutting faces angled relative to their direction of travel bite into or chip a stump with a shearing or slicing action instead of a head on impact. Thus, less power is required in the cutting effort and less time is required to chip away a stump. In a shallow cut, the cutting head 18 would be engaged but in a deeper cut both heads 18 and 19 are engaged in the cutting effort.

Referring now to the bores in the holder 20 being off horizontally with regard to one another, this has two positive effects. The bores, although misaligned with regard to one another, are equally spaced from the periphery of the blade 10 which angles the cutting heads relative to the periphery 10a of the blade to provide an additional angle for the slicing action of the cutting faces 18a and 19a.

A further function of this misalignment of the bores is that the bolts are positioned to more securely hold the cutting heads from a tendency to wabble due to the impact of the slicing action of the cutting heads.

The claw teeth as mounted herein are readily replaced as may be required.

It will, of course, be understood that various changes may be made in the form, details, arrangement and proportions of the parts without departing from the scope of the invention which generally stated, consists in a structure capable of carrying out the objects above set forth, in the parts and combination of parts as disclosed and defined in the appended claims.

What is claimed is:

1. A double claw stump cutting tooth structure, comprising a cutting tooth having a shank, a cutting head at each end of said shank, said cutting heads respectively being angled transversely of said shank to diverge laterally and being twisted outwardly to provide cutting faces at an obtuse angle to their respective cutting planes for a simultaneous slicing engagement with a stump in its cutting action.

2. The structure of claim 1, including said shank having a transverse recess.

3. The structure of claim 1, including said cutting heads respectively having cutting faces formed at the leading edges of said cutting heads.

4. The structure of claim 1, including a cutting tooth holder mounted at each side of a rotatable blade near the periphery thereof, said holders on said blade having opposed facing sides, said sides having facing transverse recesses, and a cutting tooth on each of said facing sides engaged in said recesses and having oppositely angled cutting faces.

5. The structure of claim 1, wherein said cutting tooth has a transverse recess centrally of its shank, and said recess forming a shoulder at each end thereof.

6. The structure of claim 1, including a carbide cutting tip carried by each of said cutting faces.

7. A double claw stump cutting tooth structure, having in combination a tooth holder mounted on a rotary disc blade near the periphery thereof, a cutting tooth mounted in said holder, said cutting tooth comprising a shank having a cutting head at each end thereof, said shank being secured in said holder, each of said cutting heads facing in cutting direction, one of said cutting heads extending outwardly of the periphery of said disc and the other of said cutting heads extending inwardly of said periphery of said disc, and both of said cutting heads being angled to have a slicing action in cutting engagement with a stump.

* * * * *